United States Patent [19]

Boyer

[11] 3,785,857

[45] *Jan. 15, 1974

[54] SURFACE FINISHING

[75] Inventor: Charles D. Boyer, Natrona Heights, Pa.

[73] Assignee: Allegheny Ludlum Industries, Inc., Pittsburgh, Pa.

[ * ] Notice: The portion of the term of this patent subsequent to Apr. 25, 1989, has been disclaimed.

[22] Filed: Mar. 23, 1972

[21] Appl. No.: 237,492

[52] U.S. Cl. .......... 117/124 B, 106/286, 117/169 R
[51] Int. Cl. ..................... B32b 17/06, C09d 1/00
[58] Field of Search .................. 117/124 B, 169 R; 106/286

[56] References Cited
UNITED STATES PATENTS 3,658,603  4/1972  Boyer ............................. 148/6.16
3,547,670  12/1970  Fuchs et al. ...................... 106/286

Primary Examiner—William D. Martin
Assistant Examiner—William H. Schmidt
Attorney—Vincent G. Gioia et al.

[57] ABSTRACT

A method of providing a glass surface with a protective coating, which comprises the steps of coating the surface with a solution containing magnesium, ammonium, chromate and phosphate ions, and curing said coating. A composite article comprised of a layer of glass and a substantially water insoluble, transparent, cured coating adhered thereto. The coating being comprised of magnesium cations and anionic polymeric chains of chromium, oxygen and phosphorus atoms.

11 Claims, No Drawings

SURFACE FINISHING

The present invention relates to a method of providing a glass surface with a protective coating and to a composite article comprised of a layer of glass and a protective coating adhered thereto.

Numerous articles of manufacture have glass surfaces which are subjected to severe abuse and in need of protective coatings. These articles which include mirrors, glass table tops and eyeglasses, are, for example, scratched and attacked by various chemicals.

Considerable time and money has been spent on developing a coating which will protect glass surfaces from the abuse they are subjected to. In my copending U.S. Pat. application Ser. No. 000,437; filed on Jan. 2, 1970, which issued as U.S. Pat. No. 3,658,603 on Apr. 25, 1972, I teach a cured coating of magnesium cations and anionic polymeric chains of chromium, oxygen and phosphorus atoms, for protecting metallic surfaces. In this application, I teach the use of a similar coating for protecting glass.

It is accordingly an object of this invention to furnish a method of providing a glass surface with a protective coating.

It is a further object of this invention to provide a composite article comprised of a layer of glass and a protective coating adhered thereto.

The method of this invention comprises the steps of coating the glass to be protected with a solution containing magnesium, ammonium, chromate and phosphate ions, and curing the coating so as to render it substantially water insoluble. In the course of this application, the term phosphate ion includes all ions related to phosphoric acid in an aqueous solution. Thus, the species, $H_3PO_4$, $H_2PO_4^-$, $HPO_4^=$ and $PO_4^\equiv$ and any polymeric phosphorous oxyacid anions are collectively referred to as phosphate ion. Similarly, $CrO_3$ in solution may exist as $CrO_4^=$, $Cr_2O_7^=$, etc., as well as in various protonated forms, all of which are included in the term chromate ion.

The ions may be supplied in various ways. Magnesium ion may be supplied as the oxide, hydroxide, carbonate, bicarbonate, phosphate or chromate. Ammonium ion may be supplied as uncombined ammonia, aqueous ammonium hydroxide, or as the phosphate, chromate, carbonate or bicarbonate salts. Phosphate ion is most conveniently supplied as ortho-phosphoric acid. It can also be supplied as magnesium phosphate, ammonium-phosphate or magnesium ammonium phosphate. Chromate ion may be supplied as chromium trioxide or as the chromate or dichromate salts of magnesium or ammonium The magnesium, ammonium, chromate and phosphate ions are proportionately present in the aqueous solution as 0.01–28 mole percent magnesium ion, 5–22 mole percent ammonium ion, 4–26 mole percent chromate ion and 33–67 mole percent phosphate ion and preferably as 16–26 mole percent magnesium ion, 7–15 mole percent ammonium ion, 7–21 mole percent chromate ion and 45–65 mole percent phosphate ion. Magnesium ion renders the cured coating substantially water insoluble and decreases curing times. An upper limit of 28 mole percent magnesium ion is imposed as 28 mole percent is the limit of the solubility for magnesium ion in the coating solution. Chromate ion assists in giving the coating its transparency and renders the coating substantially water insoluble after curing. Solutions with less than 4 percent chromate ion produce opaque cured coatings and solutions with more than 26 mole percent chromate ion produce blotchy coatings which require excessive curing times. Ammonium ion also assists in giving the coating its transparency. Solutions with less than 5 and more than 22 mole percent ammonium ion produce opaque cured coatings. Phosphate ion is required to render the solution acidic. A minimum phosphate ion level of 33 mole percent is necessary in order for the other ions of the solution to adequately dissolve. An upper limit of 67 mole percent phosphate ion is set, as water insoluble cured coatings are not obtained with higher levels.

The concentration of magnesium, ammonium, chromate and phosphate ions in the water should be no greater than about 1.5 moles per 100 ml. of solvent and preferably should be no greater than 0.25 mole. Solutions with concentrations in excess of 1.5 have too high a solid level and produce a cloudy, bubbly coat. On the other hand, there does not appear to be a minimum concentration for the ions. Any composition which produces a transparent coating will continue to produce a transparent coating as the amount of solvent is increased. The only effect of dilution is to decrease the coating thickness. For practical purposes, a lower limit of 0.01 mole per 100 ml. of solvent has been set. A preferred lower limit is 0.05 mole per 100 ml. of solvent. As a general rule water is the solvent of this invention, although the use of organic solvents is not excluded. In calculating molar concentrations, the only water considered is that added directly as such and as water of crystallization in the cation salts.

A wetting agent can be added to the coating solution to insure the best possible wetting action at the metal surface. The use of wetting agents is optional and by no means necessary. Typical wetting agents are "Wetanol" (Glyco Products, Inc., New York, N.Y.) and "Alkanol HCS" (E. I. duPont de Nemours & Company, Wilmington, Del.).

The invention is not dependent upon the use of any particular coating method. Illustrative methods are dip coating, flow coating and roll coating.

The coating is cured so as to render it substantially water insoluble. Curing is a time and temperature dependent process. Shorter times are required at higher temperatures and longer times are required at lower temperatures. I have reason to believe that curing temperatures; i.e., the temperature at the glass surface, ranging from 400° F to the melting point of glass can be successfully employed at times ranging from 2 seconds to 4 hours.

Various colors and tints can be given to the coating by varying the curing temperature, by altering the relative proportion of ions present in the solution, by altering the thickness of the cured coating and by adding pigments, dyes and other chemical agents. Such treatments provide an an economical means for giving glass the appearance of color.

The article of this invention is comprised of a layer of glass and at least one layer of a protective substantially water insoluble, transparent, cured coating adhered directly thereto or through an intermediate coating. The coating is comprised of magnesium cations and anionic polymeric chains of chromium, oxygen and phosphorus atoms. No limit is placed on the thickness of the coating although it is generally less than 0.0005 inch. Coating layers thicker than 0.0005 inch require an excessive amount of coating solution and acquire a frosty appearance during curing.

The following example is illustrative of several aspects of the invention.

A coating solution was prepared by mixing magnesium oxide, ammonium hydroxide (conc.), chromium trioxide, and ortho-phosphoric acid (assay 85 percent), in water. The magnesium, ammonium, chromate and phosphate ions were proportionately present in the solution as 15.5 mole percent magnesium ion, 10.1 mole percent ammonium ion, 11.9 mole percent chromate ion and 62.6 mole percent phosphate ion, and had a molar concentration of 0.113 mole per 100 ml. of water. In calculating the molar concentration of the ions, the water present in the ammonium hydroxide and ortho-phosphoric acid was ignored, as was the water of neutralization.

The coating of this invention was then applied to a piece of glass by dipping the glass into the coating solution and by subsequently curing the solution at a temperature of 600° F for 15 minutes. Examination and testing showed the coating to be transparent and water resistant.

A Rondeau scratch test was subsequently conducted to compare the scratch resistance for the coated glass with that of uncoated glass. This test clearly demonstrated a protective characteristic of the coating. Uncoated glass scratched under a load of 62 grams while the coated glass did not scratch under loads of 350 grams.

It will be apparent to those skilled in the art that the novel principles of the invention disclosed herein in connection with specific examples thereof, will suggest various other modifications and applications of the same. It is accordingly desired that in construing the breadth of the appended claims they shall not be limited to the specific examples of the invention disclosed herein.

I claim:

1. A method of providing a glass surface with a transparent, cured protective coating, which comprises the steps of: coating said glass surface with a composition consisting essentially of an aqueous solution containing magnesium, ammonium, chromate and phosphate ions, and curing said coating so as to render it substantially water insoluble; said solution having a molar concentration of said ions of between 0.01 and 1.5 moles per 100 ml. of water; and ions being proportionately present in said solution as 0.01-28 mole percent magnesium ion, 5-22 mole percent ammonium ion, 4-26 mole percent chromate ion and 33-67 mole percent phosphate ion.

2. A method according to claim 1 wherein said ions are proportionately present in said solution as 16-26 mole percent magnesium ion, 7-15 mole % ammonium ion, 7-21 mole percent chromate ion and 45-65 mole percent phosphate ion.

3. A method according to claim 1 wherein said molar concentration of said ions in said solution is between 0.05 and 0.25 mole per 100 ml. of water.

4. A method according to claim 1 adapted to provide a colored protective coating which includes the step of adding pigments of dyes, to the coating solution.

5. A method according to claim 1 wherein said coating is cured by heating said glass surface at a temperature of at least 400° F for a period of from 2 seconds to 4 hours.

6. A composite article comprising a layer of glass and at least one layer of a substantially water insoluble, cured protective coating of magnesium cations and anionic polymeric chains of chromium, oxygen and phosphorus atoms, adhered to said glass; said coating having been formed from an aqueous solution of magnesium, ammonium, chromate and phosphate ions, having a molar concentration of between 0.01 and 1.5 moles per 100 ml. of water and having said ions proportionately present as 0.01-28 mole percent magnesium ion, 5-22 mole percent ammonium ion, 4-26 mole percent chromate ion and 33-67 mole percent phosphate ion.

7. A composite article according to claim 6 wherein said protective coating is less than 0.0005 inch thick.

8. A composite article according to claim 6 wherein said protective coating is transparent and colorless.

9. A composite article according to claim 6 wherein said protective coating is transparent and colored.

10. A composite article according to claim 6 wherein said protective coating is formed from a solution having a molar concentration of said ions of between 0.05 and 0.25 mole per 100 ml. of water.

11. A composite article according to claim 6 wherein said protective coating is formed from a solution having said ions proportionately present as 16-26 mole percent magnesium ion, 7-15 mole percent ammonium ion, 7-21 mole percent chromate ion and 45-65 mole percent phosphate ion.

* * * * *